(12) United States Patent
Du

(10) Patent No.: US 10,396,679 B2
(45) Date of Patent: Aug. 27, 2019

(54) RECTIFICATION CIRCUIT WITH TRANSISTOR CHANNEL AND DIODE CHANNEL

(71) Applicant: OSRAM SYLVANIA Inc., Wilmington, MA (US)

(72) Inventor: George Zhanqi Du, North Andover, MA (US)

(73) Assignee: OSRAM SYLVANIA Inc., Wilmington, MA (US)

(*) Notice: Subject to any disclaimer, the term of this patent is extended or adjusted under 35 U.S.C. 154(b) by 0 days.

(21) Appl. No.: 16/003,064

(22) Filed: Jun. 7, 2018

(65) Prior Publication Data

US 2018/0358905 A1     Dec. 13, 2018

Related U.S. Application Data

(60) Provisional application No. 62/516,358, filed on Jun. 7, 2017.

(51) Int. Cl.
| | |
|---|---|
| H05B 33/08 | (2006.01) |
| H02M 7/217 | (2006.01) |
| B60Q 1/26 | (2006.01) |
| B60Q 1/34 | (2006.01) |
| B60Q 1/48 | (2006.01) |
| B60Q 1/04 | (2006.01) |

(52) U.S. Cl.
CPC .......... *H02M 7/217* (2013.01); *B60Q 1/2607* (2013.01); *H05B 33/0815* (2013.01); *B60Q 1/04* (2013.01); *B60Q 1/34* (2013.01); *B60Q 1/48* (2013.01); *B60Q 2400/30* (2013.01)

(58) Field of Classification Search
CPC ...... B60Q 1/0088; B60Q 1/0058; B60Q 1/04; B60Q 1/14; B60Q 1/1415; B60Q 2400/30; F21S 41/143; F21S 41/192; F21S 2115/10; F21S 41/18; F21Y 2115/10
See application file for complete search history.

(56) References Cited

U.S. PATENT DOCUMENTS

| | | | |
|---|---|---|---|
| 7,906,913 B2 | 3/2011 | Bouchard | |
| 10,076,992 B2* | 9/2018 | Sassoon | ............... F21S 41/143 |
| 2005/0219851 A1* | 10/2005 | Takeda | ............... B60O 1/2603 362/464 |
| 2017/0048935 A1* | 2/2017 | Koo | ................... H05B 33/089 |

* cited by examiner

*Primary Examiner* — Tung X Le
*Assistant Examiner* — Borna Alaeddini
(74) *Attorney, Agent, or Firm* — Shaun P. Montana

(57) ABSTRACT

A rectifying circuit is provided, which includes a first channel circuit, a comparator circuit, and a second channel circuit. The first channel circuit rectifies a first input signal using a transistor that is coupled between an input of the first channel circuit and a node. The comparator circuit is coupled with the transistor and controls it based on a difference between a representative voltage of the first input signal and a representative voltage of the node. The second channel circuit rectifies a second input signal using a diode coupled between an input of the second channel circuit and the node. The transistor may be a first MOSFET and the comparator circuit may be coupled with the first MOSFET by way of a second MOSFET. The second MOSFET controls the first MOSFET and is itself controlled by the comparator circuit.

18 Claims, 6 Drawing Sheets

RECTIFICATION CIRCUIT WITH TRANSISTOR CHANNEL AND DIODE CHANNEL

CROSS-REFERENCE TO RELATED APPLICATION

This application claims the benefit of U.S. Provisional Application No. 62/516,358 filed Jun. 7, 2017, which is herein incorporated in its entirety by reference.

TECHNICAL FIELD

The present disclosure relates to rectification circuits, and more particularly, to multi-channel rectification circuits configured with reverse voltage polarity blocking and channel ON/OFF status sensing and including at least one transistor channel and at least one diode channel.

BACKGROUND

Rectification of alternating current (AC) signals to provide a direct current signal is used in many applications. In some such applications, the given signals have to be rectified before those signals are provided to subsequent circuitry in order to prevent reverse current bias or reverse voltage polarity, during the negative portion of the input signal cycle. Use of diodes is a common solution to provide such rectification. However, there are a number of non-trivial issues associated with rectification depending on the demands of the given application, such as in the case of multi-channel rectification.

SUMMARY

As noted herein, there are a number of non-trivial issues associated with rectification depending on the demands of the given application, particularly in the case of multi-channel rectification. For instance, consider the example application of lighting systems in vehicles (e.g., cars, trucks, motorcycles, etc). Such systems are typically equipped with one or more light sources having different functions. For example, a given headlight assembly may have one or more light sources and multiple inputs for providing different types of lighting, such as park lights, turn signals, and daytime running lights (referred to herein as "park", "turn" and "DRL", to facilitate discussion). A solid state lighting system may use one or more driver modules under the power of a battery to provide the various lighting modes (e.g., park, turn, and DRL). In such cases, in order for the driver module to power the different lighting modes, the inputs have to be rectified before the input is provided to the driver module in order to prevent reverse current bias or reverse voltage polarity. One possible techniques to overcome this problem is to use rectifier diodes and sum the outcome which is fed to a switch mode power supply. Thus, continuing with the example scenario above, the light source driver module uses three diodes with three channels (one for park light, one for turn signal, and one for DRL) and one power supply. However, there is still bias current causing the diodes to conduct, which results in power loss. Another possible technique includes the use of a microcontroller to turn the channels on and off in order to determine which channel is supposed to be on. However, as will be appreciated, use of a microcontroller tends to increase cost, particularly in cases where a microcontroller may be required for each input channel.

Thus, and in accordance with an embodiment of the present disclosure, the above described problems can be overcome by using a transistor, such as a p-channel MOSFET (PFET) or n-channel MOSFET (NFET) for at least one channel in the multi-channel rectification circuit. For example, the DRL channel may feature the transistor-based circuitry while the remaining channels may use a standard or Schottky diode circuit. Note that the transistor-based rectification circuitry may still include one or more rectification diodes, in addition to a rectifying transistor. It will be further appreciated in light of the present disclosure that more than one channel may implement the transistor-based circuitry, for example both the DRL and the park channel may use the transistor, while the turn channel may use a standard diode. The DRL channel may be selected to have the transistor as it draws relatively higher current and is constant (i.e., not flashing as compared to a turn signal, which requires significantly less current in average). However, it will be appreciated in light of the present disclosure that any of the channels may use a transistor-based circuit as variously provided herein. A comparator is used to compare a representation of the transistor-based channel input voltage and a representation of voltage on a node common to the other channel(s). This comparison can be used to effectively determine whether the transistor-based channel should be on or off.

In an embodiment, there is provided a rectifying circuit. The rectifying circuit includes: a first channel circuit to rectify a first input signal using a transistor, the transistor operatively coupled between an input of the first channel circuit and a node; a comparator circuit operatively coupled with the transistor of the first channel circuit, the comparator circuit to control the transistor based on a difference between a representative voltage of the first input signal and a representative voltage of the node; and a second channel circuit to rectify a second input signal using a diode, the diode operatively coupled between an input of the second channel circuit and the node.

In a related embodiment, the first channel circuit may further include one or more rectifying diodes in addition to the transistor. In another related embodiment, the transistor may be a first transistor and the comparator circuit may be operatively coupled with the first transistor by way of a second transistor, wherein the first transistor may be controlled by the second transistor, and the second transistor may be controlled by the comparator circuit. In a further related embodiment, the first transistor may be a p-channel MOSFET and the second transistor may be an n-channel MOSFET. In another further related embodiment, a drain of the first transistor may be operatively coupled to the input of the first channel circuit, a source of the first transistor may be operatively coupled to the node, a gate of the first transistor may be operatively coupled to a drain of the second transistor, a source of the second transistor may be operatively coupled to ground, and a gate of the second transistor may be operatively coupled to an output of the comparator circuit.

In yet another related embodiment, the second channel circuit may further include one or more additional rectifying diodes. In still another related embodiment, the representative voltage of the first input signal may be generated by a first voltage divider circuit, and the representative voltage of the node may be generated by a second voltage divider circuit. In yet still another related embodiment, the diode may be a first diode, the rectifying circuit may further include a third channel circuit to rectify a third input signal using a second diode, and the second diode may be operatively coupled between an input of the third channel circuit and the node. In a further related embodiment, the third channel circuit may further include one or more additional rectifying diodes.

In another embodiment, there is provided a lighting system including the rectifying circuit of the above-described embodiment.

In another embodiment, there is provided an automobile including the lighting system of the above-described embodiment.

In another embodiment, there is provided a rectifying circuit for an automobile lighting system. The rectifying circuit includes: a first channel circuit to rectify a first lighting driver input signal using a transistor, the transistor operatively coupled between an input of the first channel circuit and a node; a comparator circuit operatively coupled with the transistor of the first channel circuit, the comparator circuit to control the transistor based on a difference between a representative voltage of the first lighting driver input signal and a representative voltage of the node; and a second channel circuit to rectify a second lighting driver input signal using a diode, the diode operatively coupled between an input of the second channel circuit and the node.

In a related embodiment, the first channel circuit may further include one or more rectifying diodes in addition to the transistor. In another related embodiment, the transistor may be a first transistor and the comparator circuit may be operatively coupled with the first transistor by way a second transistor, the first transistor may be controlled by the second transistor, and the second transistor may be controlled by the comparator circuit. In a further related embodiment, the first transistor may be a p-channel MOSFET and the second transistor may be an n-channel MOSFET. In another further related embodiment, a drain of the first transistor may be operatively coupled to the input of the first channel circuit, a source of the first transistor may be operatively coupled to the node, a gate of the first transistor may be operatively coupled to a drain of the second transistor, a source of the second transistor may be operatively coupled to ground, and a gate of the second transistor may be operatively coupled to an output of the comparator circuit.

In yet another related embodiment, the second channel circuit may further include one or more additional rectifying diodes. In still another related embodiment, the representative voltage of the first lighting driver input signal may be generated by a first voltage divider circuit, and the representative voltage of the node may be generated by a second voltage divider circuit. In yet still another related embodiment, the diode may be a first diode, the input rectifying circuit may further include a third channel circuit to rectify a third lighting driver input signal using a second diode, and the second diode may be operatively coupled between an input of the third channel circuit and the node.

In yet another related embodiment there is provided an automobile including the lighting system of the above-described embodiment.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

A multi-channel rectification circuit is disclosed that implements at least one transistor-based channel and at least one diode-based channel. The rectification circuit is configured for providing anti-reverse bias current or reverse voltage polarity blocking for different mode inputs. Although the inputs will depend on the application and can vary from one embodiment to the next, one example set of inputs are related to a lighting application. For instance, in one such embodiment, a light source, such as a light emitting diode (LED), may have multiple inputs or modes of operation, each input or mode of operation providing a different mode of lighting for the light source. One specific such example application is the lighting system of a vehicle, such as a car, truck, motorcycle, or other such road vehicle, wherein the lighting circuit may control, for instance, park lights (channel 1), turn signals (channel 2), and daytime running lights (channel 3). In such a case, one of the channels includes one or more transistors to facilitate anti-reverse bias current or reverse voltage polarity blocking for different mode inputs, while the other channels need not include transistors (e.g., diode-based channels, such as standard PN or Schottky diode channels). Numerous embodiments and applications will be apparent.

Figure 1:
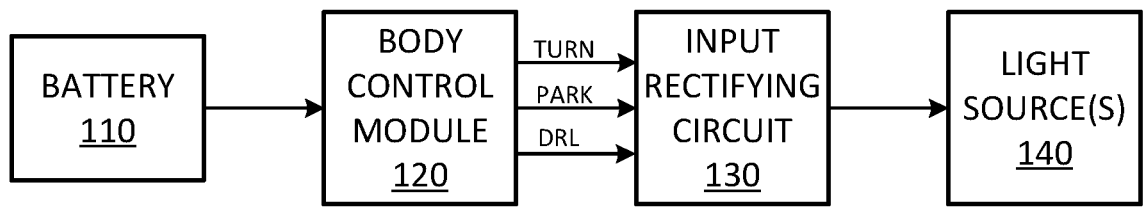
FIG. 1 illustrates a block diagram of an overall lighting control system including an input rectifying circuit, configured according to embodiments disclosed herein.

FIG. 1 illustrates a block diagram of an overall lighting system including an input rectifying circuit, in accordance with an embodiment of the present disclosure. The system may be part of a vehicle, such as an automobile, although other devices or systems having at least one light source with two or more modes of operation and a power supply may equally benefit from an embodiment of the present disclosure.

As can be seen, a battery 110 provides power to a body control module 120, in this example embodiment. The body control module 120 provides the various channel outputs that are fed into an input rectifying circuit 130 for control of the light source(s) 140. The light source(s) 140 may be controlled by an LED driver module of the light source that may be, for example, embedded within or otherwise operatively coupled with the light source(s) 140. In the example embodiment shown, there are three example inputs: "turn" for the turn signal mode, "park" for the park lights mode, and "DRL" for the daytime running lights mode. The outputs are then fed into the input rectifying circuit 130 for rectification and to prevent reverse bias current or reverse voltage polarity. As described herein, it is desirable to prevent reverse bias current or reverse voltage polarity while also ensuring that the proper output values are provided to the light source(s) 140.

Although shown and generally described herein with respect to the three modes of a light source for a vehicle, it will be appreciated in light of the present disclosure that the disclosure is likewise applicable to other multi-mode light sources or other multi-mode channelized circuits. For example, airplanes, computing devices, or any other devices or systems having multiple modes of operation of light sources may employ the techniques of the present disclosure. Similarly, numerous other control applications beyond lighting may have the need for multiple rectified input signals where it is necessary or otherwise desirable to block reverse bias current or reverse voltage polarity. The circuits and techniques provided herein can be equally applied to any such control applications.

Figure 2:
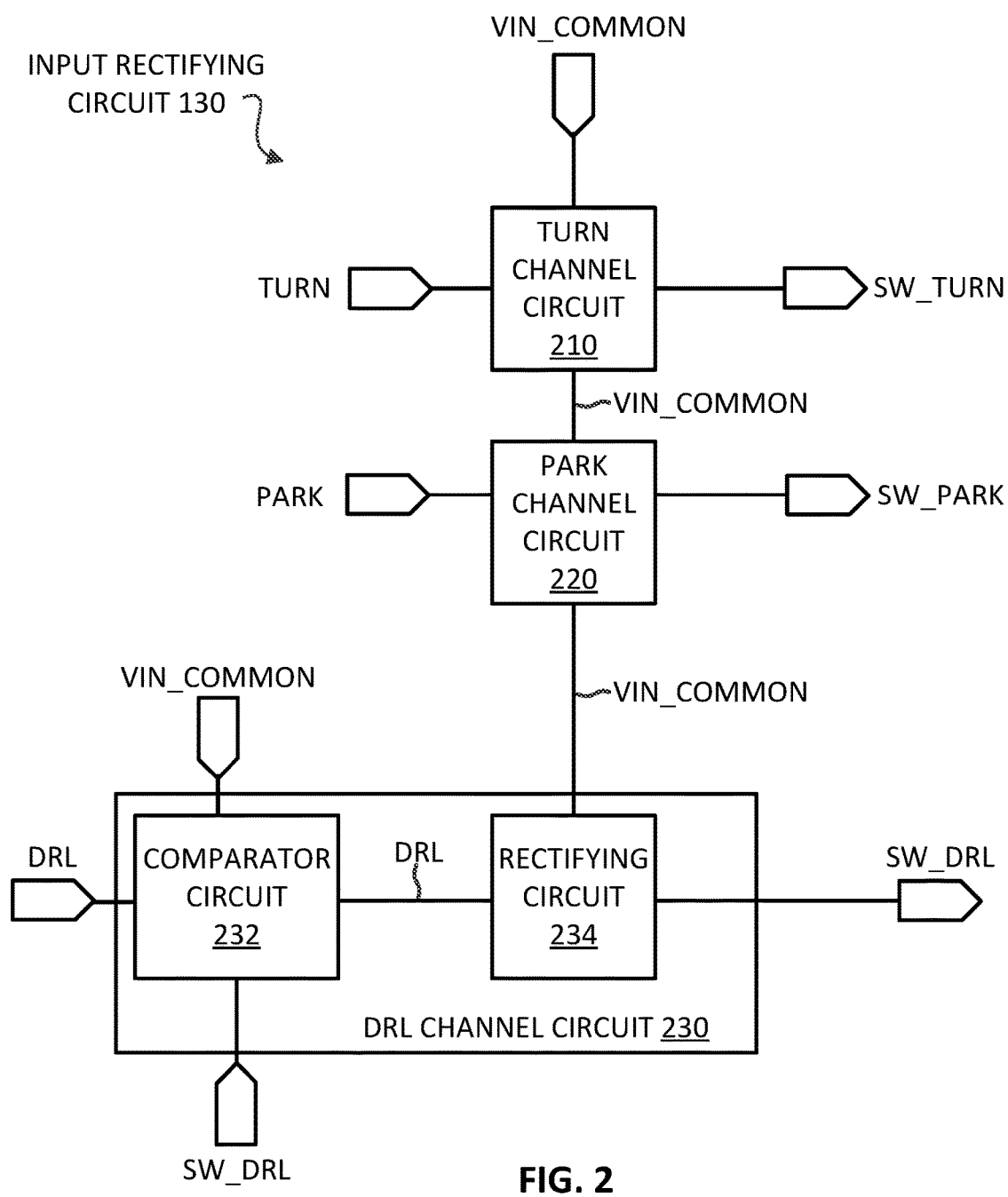
FIG. 2 illustrates a block diagram of an input rectifying circuit, configured according to embodiments disclosed herein.

FIG. 2 illustrates a block diagram of an input rectifying circuit, such as input rectifying circuit 130, in accordance with an embodiment of the present disclosure. As can be seen, the TURN input is fed to the turn channel circuit 210. The turn channel circuit 210 includes a diode (not shown) to prevent the reverse current bias, as described in greater detail below regarding FIGS. 3-4. The turn channel circuit 210 provides an output SW_TURN to the light source to indicate the light source(s) 140 should be in turn signal mode. The PARK input is fed to the park channel circuit 220. The park channel circuit 220 provides the switching signal SW_PARK to the light source to indicate the light source 140 should be in park mode. The park channel circuit includes a diode (not shown) to prevent reverse current bias, in accordance with an embodiment of the present disclosure.

The DRL input is fed to the DRL channel circuit 230. The DRL channel circuit 230 provides the switching signal SW_DRL to the light source to indicate the light source 140 should be in DRL mode. As can be further seen, the DRL channel circuit 230 includes a comparator circuit 232 and a rectifying circuit 234. The comparator circuit 230 compares a representation of the DRL input voltage with a representation of the voltage on the VIN_COMMON node, which is common to all channels of the multi-channel rectifying circuit. The rectifying circuit 234 provides a rectified version of the DRL signal, and will be discussed in further detail with respect to FIG. 4.

Figure 3:
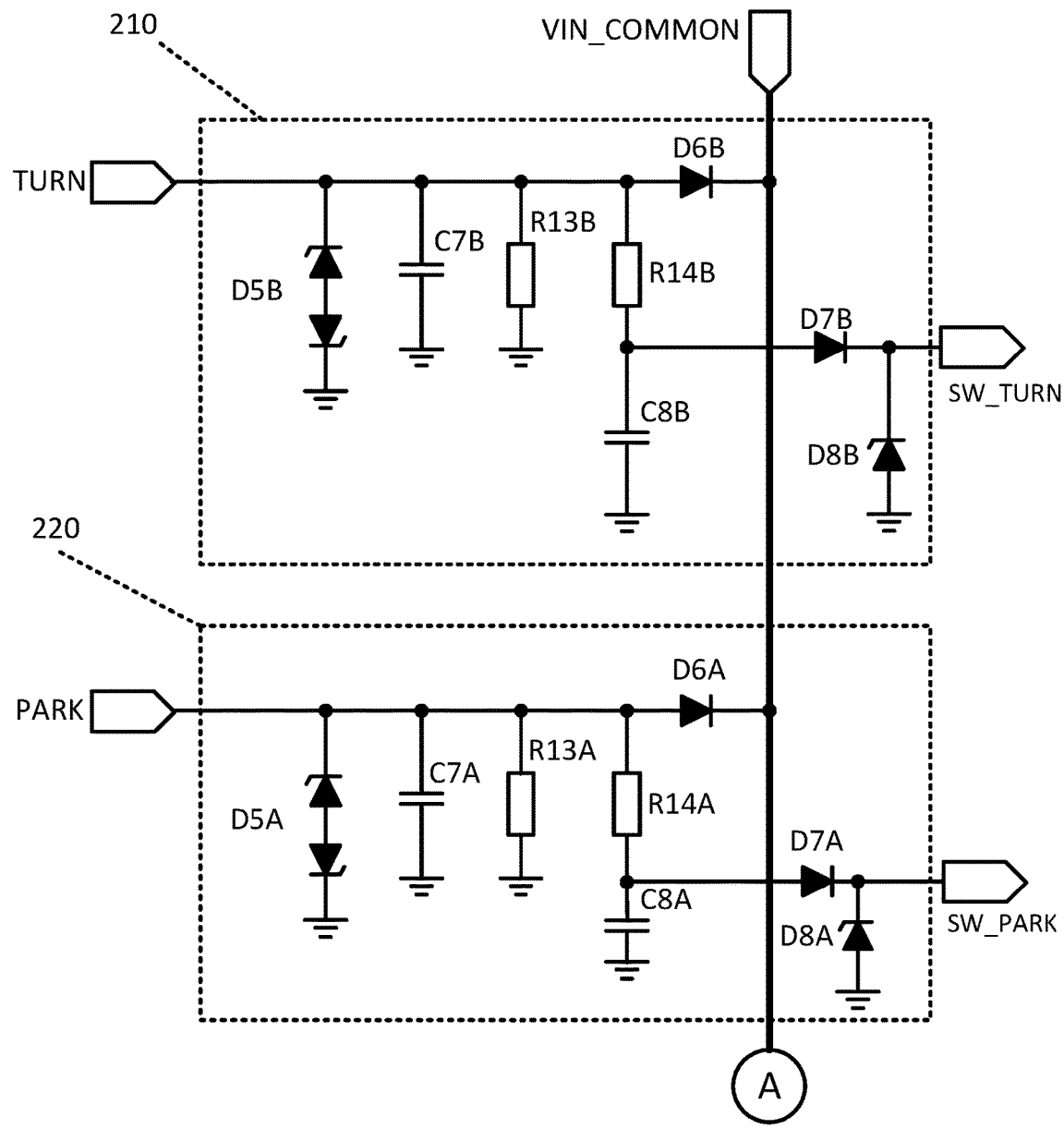
FIG. 3 depicts a schematic diagram of two diode-based channels of an input rectifying circuit, configured according to embodiments disclosed herein.

FIG. 3 illustrates a park channel circuit 220 (e.g., for the park mode) and a turn channel circuit 210 (e.g., for the turn mode) in accordance with an embodiment of the present disclosure. While in this example two channel circuits are shown, it will be appreciated that any number of channel circuits may be used (one or more) in conjunction with a transistor-based channel circuit such as the example shown in FIG. 4. Each of the channel circuits shown in FIG. 3 has a channel circuit input and a respective channel circuit output. The channel circuit 220 in this embodiment is for the park lights or "PARK" mode of the light source and has a channel circuit input PARK and a channel circuit output SW_PARK which is the switching signal provided to the light source to indicate to the light source to enter into the park mode where the parking lights are activated. The channel circuit 210 in this embodiment is for the turn signal or "TURN" mode for the light source. The channel circuit 210 has a channel circuit input TURN and a channel circuit output SW_TURN, which is the switching signal provided to the light source to indicate to the light source to enter into the turn signal mode when a turn input is received.

Each of channel circuits 220, 210 includes a rectifying diode D6A, D6B. Each diode D6A, D6B has an anode connected to a channel circuit input and a cathode connected to the VIN_COMMON node, which is also designated as node A to show continuity with FIG. 4, as will be discussed in turn. In addition, each channel circuit 220, 210 further includes: a diode clamping circuit D5 (bi-directional zeners D5A, D5B) connected between a channel circuit input and ground (providing a clamping function for over-voltage protection); a resistor R13 (R13A, R13B) having a first lead connected to the channel circuit input and a second lead connected to ground; a resistor R14 (R14A, R14B) having a first lead connected to the channel circuit input and a second lead; a capacitor C7 (C7A, C7B) having a first lead connected to the channel circuit input and a second lead connected to ground; a capacitor C8 (C8A, C8B) having a first lead connected to the second lead of resistor R14 (R14A, R14B) and a second lead connected to ground; a rectifying diode D7 (D7A, D7B) having an anode connected to the second lead of resistor R14 (R14A, R14B) and the first lead of C8 (C8A, C8B), and a cathode; and a zener diode D8 (D8A, D8B) having an anode connected to ground and a cathode connected to the cathode of diode D7 (D7A, D7B) and connected to the channel circuit output. As will be appreciated, diodes D8A and D8B operate to clamp the voltage on nodes SW_Park and SW_Turn, respectively, in case the voltage at the cathode of D7 (D7A, D7B) exceeds its threshold (as set by the rating of the zener diode D8 (D8A, D8B).

Figure 4:
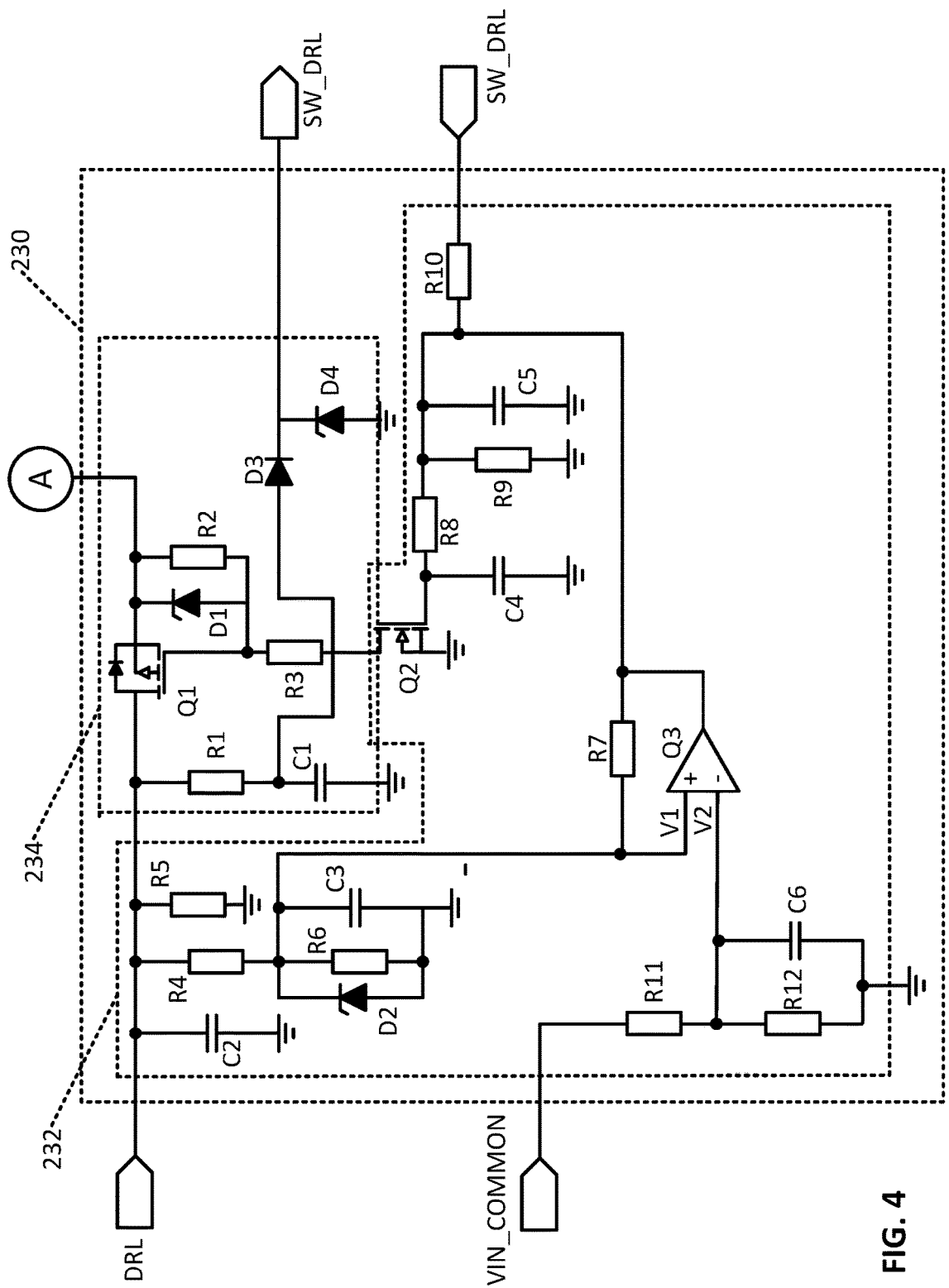
FIG. 4 depicts a schematic diagram of a transistor-based channel of the input rectifying circuit of FIG. 3, configured according to embodiments disclosed herein.

FIG. 4 depicts a schematic diagram of a transistor-based channel of the input rectifying circuit of FIG. 3, configured in accordance with an embodiment of the present disclosure. As can be seen, the DRL circuit 230 is used for the transistor-based channel in this example case, but the present disclosure is not so limited, as will be appreciated. The circuit 230 includes a comparator circuit 232 and a rectifying circuit 234. The comparator circuit 232 is in electrical communication with the rectifying circuit 234. As previously noted with reference to FIG. 3, node A refers to the VIN_COMMON node that is also coupled to the other channels, in this example embodiment.

As can be seen, the rectifying circuit 234 includes: a transistor Q1 having a gate, a source, and a drain, with the source connected to the VIN_COMMON node and the drain connected to the input of the rectifying circuit 234; a resistor R1 having a first lead coupled to the input of the rectifying circuit 234 and the drain of transistor Q1, and having a second lead connected to the output of the rectifying circuit 234; a resistor R2 having a first lead connected to the source of transistor Q1 and having a second lead connected to the gate of transistor Q1; a resistor R3 having a first lead connected to the gate of transistor Q1 and a second lead connected to the drain of Q2 of the comparator circuit (as will be discussed in turn); a capacitor C1 having a first lead connected to the second lead of resistor R1 and a second lead connected to ground; and a diode D1 having an anode connected to the second lead of the second resistor and having a cathode connected to the first lead of the second resistor. In one particular embodiment, the transistor Q1 comprises a p-channel power metal oxide semiconductor field effect transistor (MOSFET). Other suitable transistors (e.g., n-channel MOSFETs, bipolar junction transistors, etc) can be used as well, as will be readily appreciated. The rectifying circuit 234 further includes: a diode D3 having an anode connected to the second terminal of resistor R1, and a cathode connected to the SW_DRL node; and a zener diode D4 having an anode connected to ground and a cathode connected to the SW_DRL node. As will be appreciated, diode D4 operates to clamp the voltage on nodes SW_DRL in case the voltage at the cathode of D3 exceeds its threshold (as set by the rating of the zener diode D4.

The comparator circuit 232 includes transistor Q2 having a gate, a source and a drain wherein the drain is connected to the second lead of resistor R3, and wherein the source is connected to ground; a comparator Q3 having a first comparator input, a second comparator input, and a comparator output; a resistor R4 having a first lead connected to the input of the comparator circuit 232 (DRL node) and a second lead; a resistor R5 having a first lead connected to the input of the comparator circuit 232 and having a second lead connected to ground; a resistor R6 having a first lead connected to the second lead of resistor R4 and having a second lead connected to ground; a resistor R7 having a first lead connected to the first lead of the sixth resistor and the first input of comparator Q3 and having a second lead connected to the output of comparator Q3; a resistor R8 having a first lead connected to the gate of transistor Q2 and having a second lead connected to the second lead of resistor R7; a resistor R9 having a first lead connected to the second lead of resistor R8 and having a second lead connected to ground; a tenth resistor R10 having a first lead connected to the second lead of resistor R8 and having a second lead connected to the SW_DRL node; a resistor R11 having a first lead connected to the VIN_COMMON node and having a second lead connected to the second input of comparator Q3; a resistor R12 having a first lead connected to the second lead of resistor R11 and having a second lead connected to ground; a capacitor C2 having a first lead connected to the input of the comparator circuit 232 (DRL node) and a second lead connected to ground; a capacitor C3 having a first lead connected to the second lead of resistor R4 and a second lead connected to ground; a capacitor C4 having a first lead connected to the gate of transistor Q2 and a second lead connected to ground; a capacitor C5 having a first lead connected to the second lead of resistor R8 and a second lead connected to ground; a capacitor C6 having a first lead connected to the second input of comparator Q3 and having a second lead connected to ground; and a diode D2 having an anode connected to ground and a cathode connected to the first lead of resistor R6. In some embodiments, the transistor Q2 comprises an n-channel power MOSFET. Other suitable transistors (e.g., p-channel MOSFETs, bipolar junction transistors, etc.) can be used as well, as will be appreciated. The comparator Q3 comprises an operational amplifier in this example, but any number of comparator circuits can be used.

Thus, and in accordance with an embodiment of the present disclosure, an input rectifying circuit 130, such as depicted in FIGS. 3 and 4, has three control signal inputs: daytime running lights (DRL), park, and turn. The transistor Q1 (e.g., PFET) provides rectification and is controlled by transistor Q2 (e.g., an NFET), and Q2 is controlled by a comparator Q3 (e.g., op-amp or other suitable comparison circuitry). The comparator Q3 compares the input voltages between the input voltage divider (R4, R6) for V1 and the output voltage divider (R11, R12) for V2 to determine which channels should be on (if any) and which channels should be off (if any), to perform appropriate switching between the various modes of the light source.

With further reference to FIG. 4, when DRL input is turned off, the VIN_COMMON node will drop about 0.8V below the input voltage because as the power source may be from Turn, Park, or both Turn and Park. The input V1 to the comparator Q3 is decreased much faster than input V2 due to the RC delay from the resistor R12 and capacitor C6. The output of comparator Q3 is thus low when DRL is off, and therefore it disables transistor Q2 and then transistor Q1. When transistor Q1 is off, the input voltage for the DRL is also off.

Figure 5A:
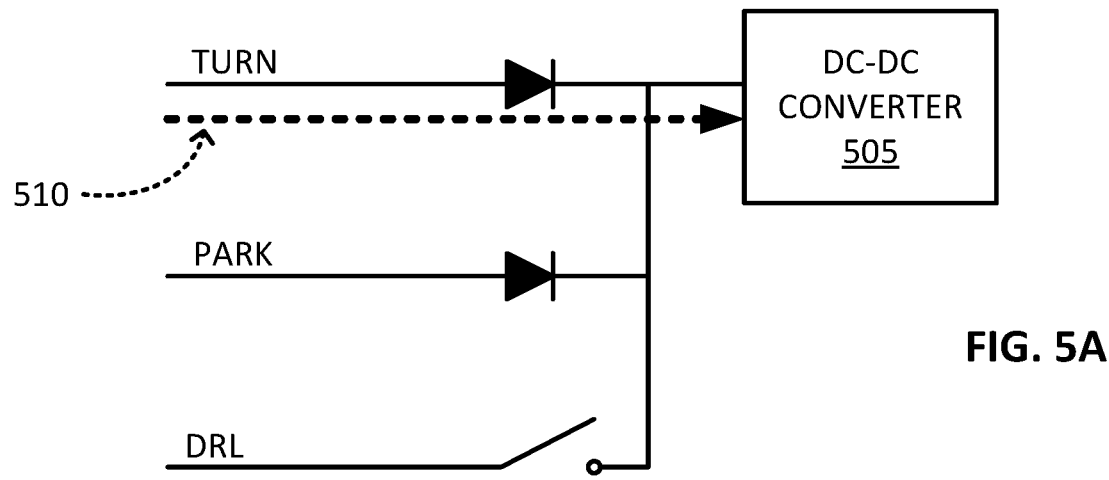
FIGS. 5A-5D illustrate various example flows of the current through an input rectifying circuit, based on a given input, according to embodiments disclosed herein.
Figure 5B:
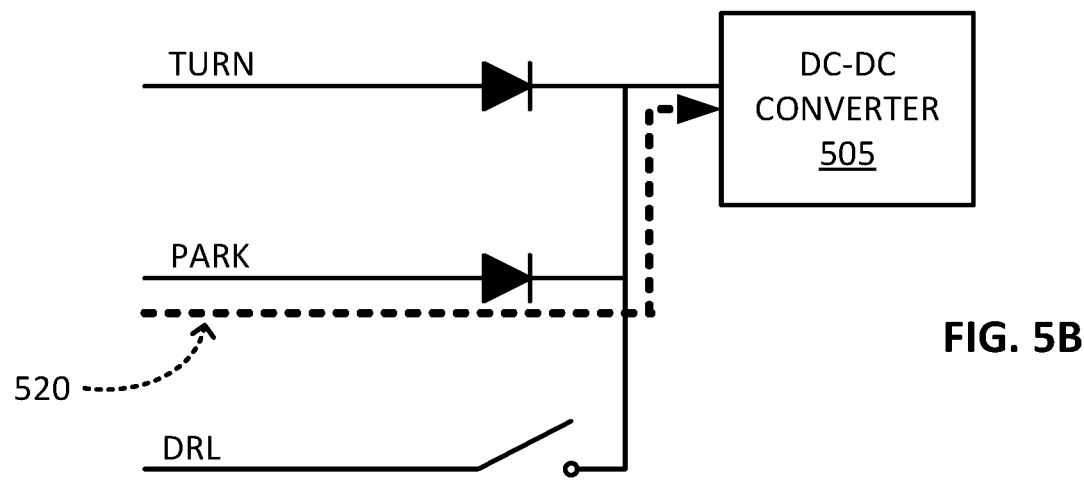
Figure 5C:
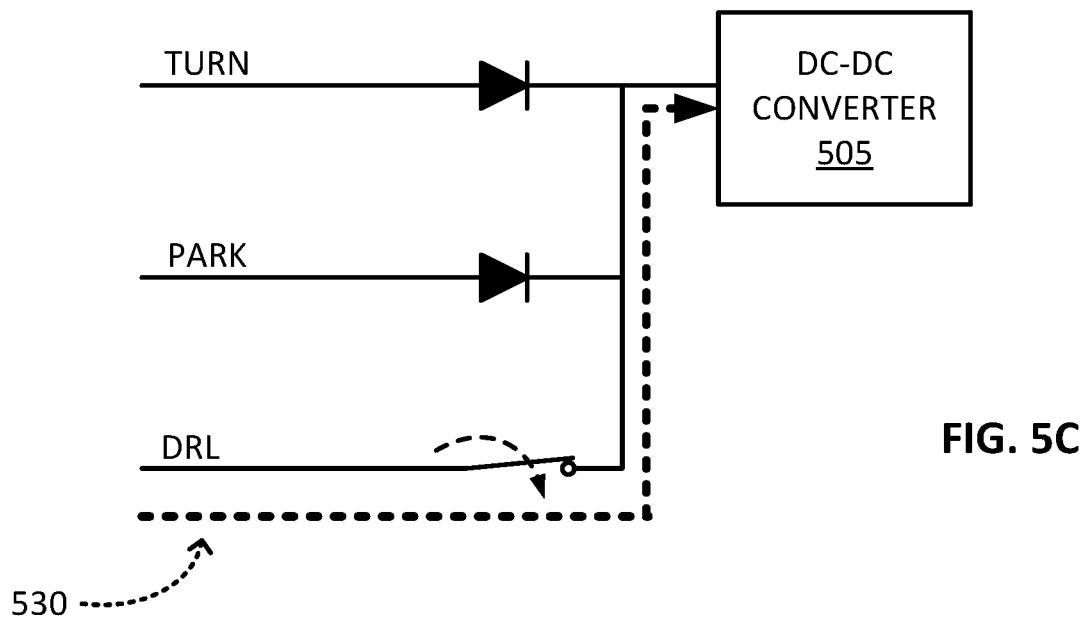
Figure 5D:
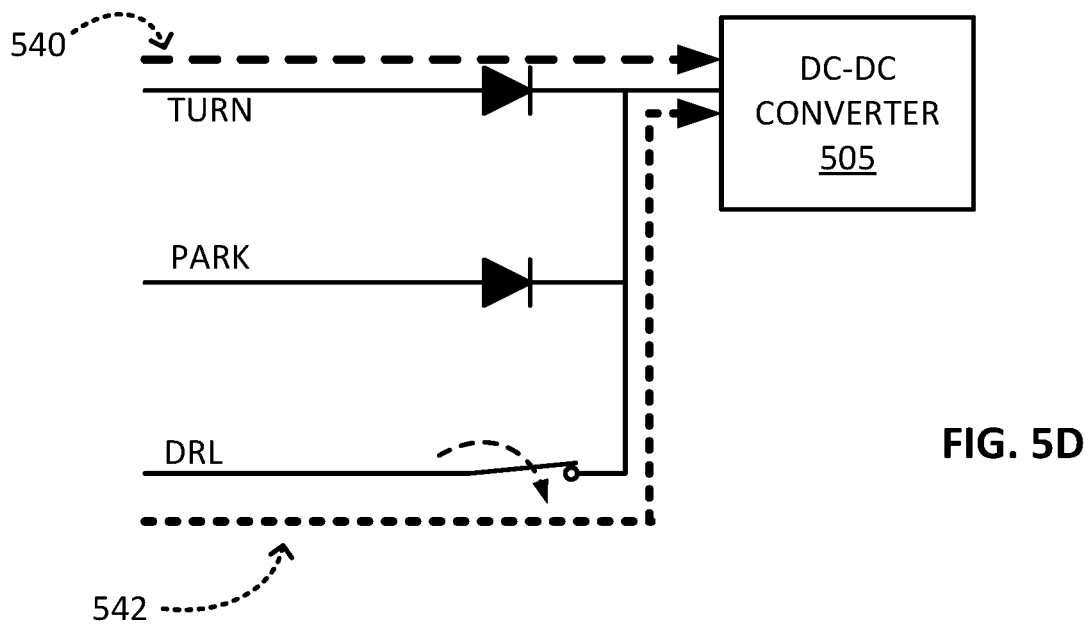

FIGS. 5A-5D illustrate various example flows of the current through the system, based on a given input, in accordance with an embodiment of the present disclosure. In more detail, FIG. 5A shows the flow of current with only the Turn input on, FIG. 5B shows the flow of current with only the Park input on, FIG. 5C shows the flow of current with only the DRL input on, and FIG. 5D shows the flow of current with both the Turn input and the DRL input on. The example embodiments of FIGS. 5A-5D are shown as being output to a DC-DC converter 505. The DC-DC converter may be within the light source, for example as part of the circuitry for the driver module of the light source. It will be appreciated that the output of the input rectifying circuit 130 (such as depicted in further detail in FIGS. 3 and 4) may be fed into other components than the DC-DC converter.

Reference is made to FIGS. 5A and 5B showing, respectively, a simplified schematic diagram of the flow of current through the input rectifying circuit for the Turn input only and the Park input only scenarios, in accordance with an embodiment of the present disclosure. In this case, the VIN_COMMON node will be approximately equal to a 0.8 V voltage drop across diode D6 (D6A, D6B) below the input voltage applied at the turn input. Since the transistor Q1 of the rectifying circuit 234 for the DRL input is off, enabling the Turn or Park input will not trigger the DRL input circuitry (for example, capacitor C1 and resistor R1). Thus, the DRL input will remain off and still appear off. As shown in FIG. 5A, when in Turn only mode, the current flows through the diode (e.g., D7B) for the turn input, as shown by dotted line 510, and the DRL switch remains opened. As shown in FIG. 5B, when in the Park only mode, the current flows through the diode D7A for the Park input, as indicated by the dotted line 520, and the DRL switch remains opened. As will be appreciated, the current flows as 510 and 520 if both modes are turned "on" or otherwise enabled.

Reference is made to FIG. 5C showing a simplified schematic diagram of the flow of current through the input rectifying circuit for the DRL input only, in accordance with an embodiment of the present disclosure. In this case, with reference to FIG. 4, the voltage input V1 to comparator Q3 is higher than the voltage input V2 to the comparator Q3 when the DRL is on, due to a very small voltage drop across the drain to source of the transistor Q1. Also, the voltage V1 rises much quicker due to transistor Q1 being turned on and the RC delay (for example, from resistor R12 and capacitor C6) of the V2. The output of the comparator Q3 is high and therefore the transistor Q2 is enabled by resistor R3. The resulting flow is shown as dotted line 530, which does not suffer from power loss (which would occur if a diode was used and conducting as the anti-reverse bias component).

Reference is made to FIG. 5D showing both the turn mode and the DRL mode turned on, in accordance with an embodiment of the present disclosure. The VIN_COMMON node will be approximately equal to the input minus an approximate 0.12 V due to transistor Q1 being on (refer, for example, to FIG. 4). The rest of the diode channels (e.g., Park in this example case) will not be biased because the input currents will flow through lower impedance channels. As shown, current primarily flows through the low impedance path 542, while a small amount of current flows through path 540. The current similarly flows if the Park, Turn, and DRL modes are all turned on, with the majority flowing through DRL, and a lesser amount of current flowing through both Park and Turn.

In operation, when the DRL is on then gets turned off and another channel is turned on, due to the low impedance of Q1, current still flows in DRL circuit. In order to check if this channel should still be turned on, the comparator Q3 is used. Comparator Q3 receives the DRL signal through a voltage divider (R4 and R6) on a positive input V1, and receives a representation of the voltage from the VIN_COMMON node through another voltage divider (R11 and R12) on the negative input V2 of the comparator Q3. The negative input (V2) will drop slower than positive input (V1) due to the presence of C6, so the output of Q3 will sink current. As a result, Q2 turns off, which in turn turns off Q1, so the input voltage for the DRL is also off.

Advantages of systems according to various embodiments should be apparent in light of this disclosure. For instance, possible advantages of some embodiments include providing a low-cost quality anti-reverse bias current or reverse voltage polarity rectifying circuit. Some embodiments may provide discrete, passive components for performing the switching between the various modes of operation, without requiring active complex components such as a microcontroller. Other embodiments, however, may use a microcontroller, if desired. Another possible advantage of some embodiments includes reducing the amount of power lost, so as to enhance overall performance of the system. Note that not all embodiments of the present disclosure require any or all of these various advantages, and numerous configurations and variations will be apparent in light of this disclosure.

Numerous variations and configurations will be apparent in light of the disclosure. Further example embodiments are as follows.

Example 1 is a rectifying circuit, comprising: a first channel circuit for rectifying a first input signal using a transistor, the transistor operatively coupled between an input of the first channel circuit and a node; a comparator circuit operatively coupled with the transistor of the first channel circuit, the comparator circuit for controlling the transistor based on a difference between a representative voltage of the first input signal and a representative voltage of the node; and a second channel circuit for rectifying a second input signal using a diode, the diode operatively coupled between an input of the second channel circuit and the node. Note that the comparator circuit can control the transistor directly (e.g., output of comparator coupled directly to base/gate of transistor), or indirectly by way of controlling one or more intervening transistors or other circuitry.

Example 2 includes the subject matter of Example 1, wherein the first channel circuit further includes one or more rectifying diodes in addition to the transistor.

Example 3 includes the subject matter of Example 1 or 2, wherein the transistor is a first transistor and the comparator circuit is operatively coupled with the first transistor by way a second transistor, wherein the first transistor is controlled by the second transistor, and the second transistor is controlled by the comparator circuit.

Example 4 includes the subject matter of Example 3, wherein the first transistor is a p-channel MOSFET and the second transistor is an n-channel MOSFET.

Example 5 includes the subject matter of Example 3 or 4, wherein a drain of the first transistor is operatively coupled to the input of the first channel circuit, a source of the first transistor is operatively coupled to the node, a gate of the first transistor is operatively coupled to a drain of the second transistor, a source of the second transistor is operatively coupled to ground, and a gate of the second transistor is operatively coupled to an output of the comparator circuit.

Example 6 includes the subject matter of any of the previous Examples, wherein the second channel circuit further includes one or more additional rectifying diodes.

Example 7 includes the subject matter of any of the previous Examples, wherein the representative voltage of the first input signal is generated by a first voltage divider circuit, and the representative voltage of the node is generated by a second voltage divider circuit.

Example 8 includes the subject matter of any of the previous Examples, wherein the diode is a first diode, the rectifying circuit further comprising a third channel circuit for rectifying a third input signal using a second diode, the second diode operatively coupled between an input of the third channel circuit and the node.

Example 9 includes the subject matter of Example 8, wherein the third channel circuit further includes one or more additional rectifying diodes.

Example 10 is a lighting system comprising the rectifying circuit of any of the previous Examples.

Example 11 is an automobile including the lighting system of Example 10.

Example 12 is a rectifying circuit for an automobile lighting system, the rectifying circuit comprising: a first channel circuit for rectifying a first lighting driver input signal using a transistor, the transistor operatively coupled between an input of the first channel circuit and a node; a comparator circuit operatively coupled with the transistor of the first channel circuit, the comparator circuit for controlling the transistor based on a difference between a representative voltage of the first lighting driver input signal and a representative voltage of the node; and a second channel circuit for rectifying a second lighting driver input signal using a diode, the diode operatively coupled between an input of the second channel circuit and the node. As previously noted, the comparator circuit can control the transistor directly, or indirectly by way of controlling one or more intervening circuits.

Example 13 includes the subject matter of Example 12, wherein the first channel circuit further includes one or more rectifying diodes in addition to the transistor.

Example 14 includes the subject matter of Example 12 or 13, wherein the transistor is a first transistor and the comparator circuit is operatively coupled with the first transistor by way a second transistor, wherein the first transistor is controlled by the second transistor, and the second transistor is controlled by the comparator circuit.

Example 15 includes the subject matter of Example 14, wherein the first transistor is a p-channel MOSFET and the second transistor is an n-channel MOSFET.

Example 16 includes the subject matter of Example 14 or 15, wherein a drain of the first transistor is operatively coupled to the input of the first channel circuit, a source of the first transistor is operatively coupled to the node, a gate of the first transistor is operatively coupled to a drain of the second transistor, a source of the second transistor is operatively coupled to ground, and a gate of the second transistor is operatively coupled to an output of the comparator circuit.

Example 17 includes the subject matter of any of Examples 12 through 16, wherein the second channel circuit further includes one or more additional rectifying diodes.

Example 18 includes the subject matter of any of Examples 12 through 17, wherein the representative voltage of the first lighting driver input signal is generated by a first voltage divider circuit, and the representative voltage of the node is generated by a second voltage divider circuit.

Example 19 includes the subject matter of any of Examples 12 through 18, wherein the diode is a first diode, the input rectifying circuit further comprising a third channel circuit for rectifying a third lighting driver input signal using a second diode, the second diode operatively coupled between an input of the third channel circuit and the node.

Example 20 is an automobile including the lighting system of any of Examples 12 through 19.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, Blu-Ray, magnetic disk, internal hard drive, external hard drive, memory stick, flash drive, solid state memory device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s), handheld device(s) such as cellular telephone(s) or smartphone(s) or tablet(s), laptop(s), laptop/tablet hybrid(s), handheld computer(s), smart watch(es), or any another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A rectifying circuit, comprising:
    a first channel circuit to rectify a first input signal using a transistor, the transistor operatively coupled between an input of the first channel circuit and a node;
    a comparator circuit operatively coupled with the transistor of the first channel circuit, the comparator circuit to control the transistor based on a difference between a representative voltage of the first input signal and a representative voltage of the node; and a second channel circuit to rectify a second input signal using a diode, the diode operatively coupled between an input of the second channel circuit and the node;

wherein the transistor is a first transistor and the comparator circuit is operatively coupled with the first transistor by way of a second transistor, wherein the first transistor is controlled by the second transistor, and the second transistor is controlled by the comparator circuit.

2. The rectifying circuit of claim 1, wherein the first channel circuit further comprises one or more rectifying diodes in addition to the transistor.

3. The rectifying circuit of claim 1, wherein the first transistor is a p-channel MOSFET and the second transistor is an n-channel MOSFET.

4. The rectifying circuit of claim 1, wherein a drain of the first transistor is operatively coupled to the input of the first channel circuit, a source of the first transistor is operatively coupled to the node, a gate of the first transistor is operatively coupled to a drain of the second transistor, a source of the second transistor is operatively coupled to ground, and a gate of the second transistor is operatively coupled to an output of the comparator circuit.

5. The rectifying circuit of claim 1, wherein the second channel circuit further comprises one or more additional rectifying diodes.

6. The rectifying circuit of claim 1, wherein the representative voltage of the first input signal is generated by a first voltage divider circuit, and the representative voltage of the node is generated by a second voltage divider circuit.

7. The rectifying circuit of claim 1, wherein the diode is a first diode, the rectifying circuit further comprises a third channel circuit to rectify a third input signal using a second diode, and the second diode is operatively coupled between an input of the third channel circuit and the node.

8. The rectifying circuit of claim 7, wherein the third channel circuit further comprises one or more additional rectifying diodes.

9. A lighting system comprising the rectifying circuit of claim 1.

10. An automobile comprising the lighting system of claim 9.

11. A rectifying circuit for an automobile lighting system, the rectifying circuit comprising:

a first channel circuit to rectify a first lighting driver input signal using a transistor, the transistor operatively coupled between an input of the first channel circuit and a node;

a comparator circuit operatively coupled with the transistor of the first channel circuit, the comparator circuit to control the transistor based on a difference between a representative voltage of the first lighting driver input signal and a representative voltage of the node; and a second channel circuit to rectify a second lighting driver input signal using a diode, the diode operatively coupled between an input of the second channel circuit and the node;

wherein the transistor is a first transistor and the comparator circuit is operatively coupled with the first transistor by way a second transistor, wherein the first transistor is controlled by the second transistor, and the second transistor is controlled by the comparator circuit.

12. The rectifying circuit of claim 11, wherein the first channel circuit further comprises one or more rectifying diodes in addition to the transistor.

13. The rectifying circuit of claim 11, wherein the first transistor is a p-channel MOSFET and the second transistor is an n-channel MOSFET.

14. The rectifying circuit of claim 11, wherein a drain of the first transistor is operatively coupled to the input of the first channel circuit, a source of the first transistor is operatively coupled to the node, a gate of the first transistor is operatively coupled to a drain of the second transistor, a source of the second transistor is operatively coupled to ground, and a gate of the second transistor is operatively coupled to an output of the comparator circuit.

15. The rectifying circuit of claim 11, wherein the second channel circuit further comprises one or more additional rectifying diodes.

16. The rectifying circuit of claim 11, wherein the representative voltage of the first lighting driver input signal is generated by a first voltage divider circuit, and the representative voltage of the node is generated by a second voltage divider circuit.

17. The rectifying circuit of claim 11, wherein the diode is a first diode, the input rectifying circuit further comprises a third channel circuit to rectify a third lighting driver input signal using a second diode, and the second diode is operatively coupled between an input of the third channel circuit and the node.

18. An automobile comprising the lighting system of claim 11.

* * * * *